W. F. KURTZ.
WRINGER.
APPLICATION FILED SEPT. 25, 1914.

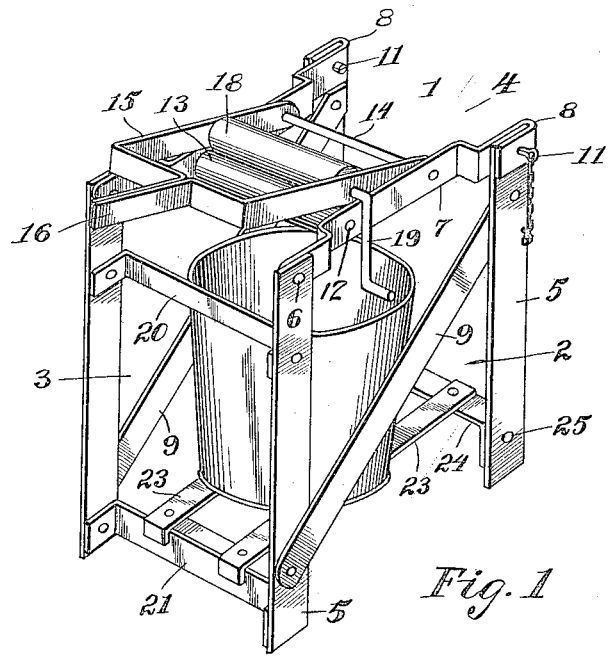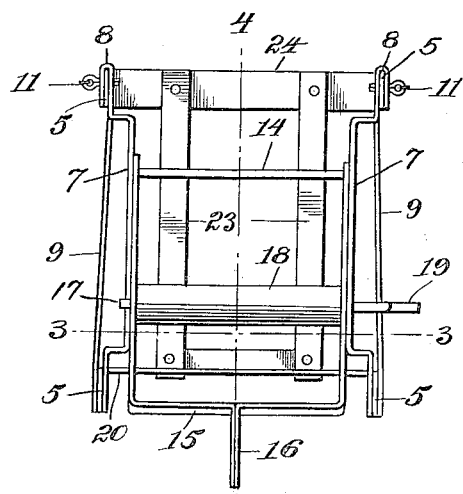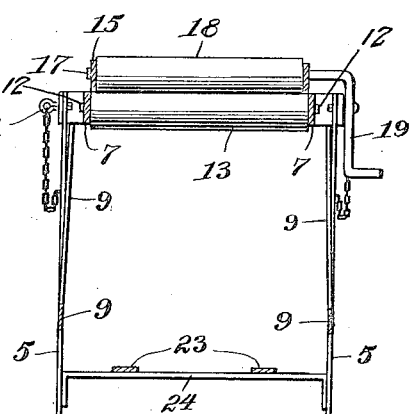

1,140,989.

Patented May 25, 1915.
2 SHEETS—SHEET 2.

Witnesses

Inventor
William F. Kurtz,
By Victor J. Evans
Attorney

THE NORRIS PETERS CO., PHOTO-LITHO., WASHINGTON, D. C.

UNITED STATES PATENT OFFICE.

WILLIAM F. KURTZ, OF ABERDEEN, SOUTH DAKOTA.

WRINGER.

1,140,989.

Specification of Letters Patent. Patented May 25, 1915.

Application filed September 25, 1914. Serial No. 863,528.

*To all whom it may concern:*

Be it known that I, WILLIAM F. KURTZ, a citizen of the United States, residing at Aberdeen, in the county of Brown and State of South Dakota, have invented new and useful Improvements in Wringers, of which the following is a specification.

The present invention relates to improvements in wringers and stands therefor, and the primary object of the invention is to provide a wringer for mops or the like with a collapsible stand which serves as a support for a water pail.

Another object of the invention is to provide a device of this class which may be easily and quickly set up and retained in a rigid operative position, and which may be collapsed and folded to provide a small bundle for storage or packing when the device is not in use.

With the above and other objects in view, the improvements resides in the construction, combination and arrangement of parts set forth in the following specification and falling within the scope of the appended claims.

Figure 4:
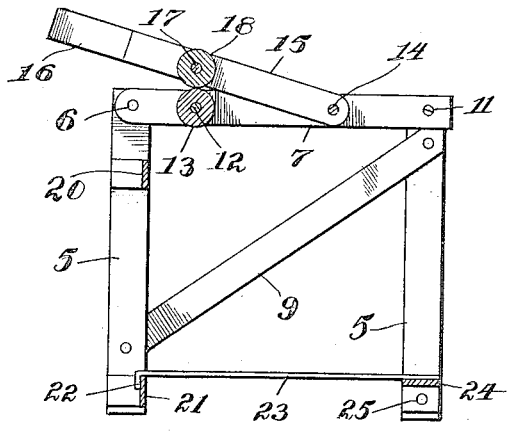
Figure 5:
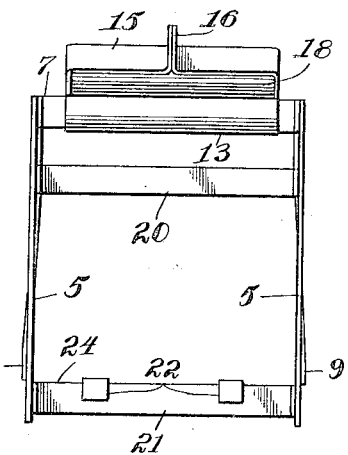
Figure 6:
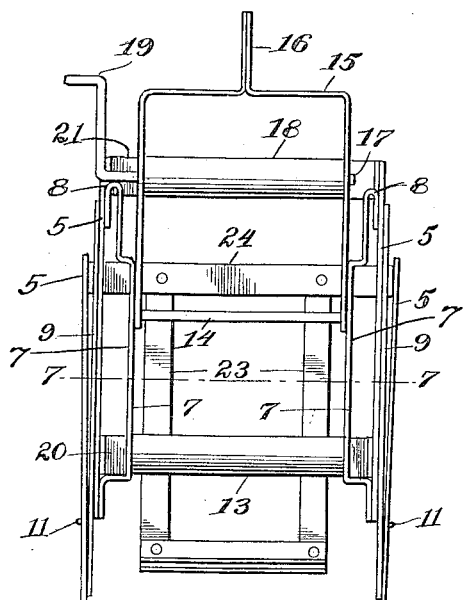
Figure 7:
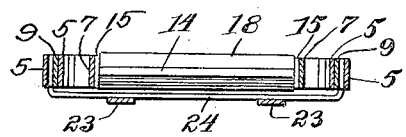

In the drawings: Figure 1 is a perspective view of the improvement showing the same supporting a pail, Fig. 2 is a top plan view of the same, Fig. 3 is a sectional view on the line 3—3 of Fig. 2, Fig. 4 is a sectional view on the line 4—4 of Fig. 2, Fig. 5 is a front elevation of the device, Fig. 6 is a view of the device in its collapsed or folded position, and Fig. 7 is a sectional view approximately on the line 7—7 of Fig. 6.

Referring now to the drawings in detail, the numeral 1 designates my improved device in its entirety. This device is in the nature of a frame, comprising sides 2, a front 3 and an open rear portion 4. The sides each comprise a pair of spaced uprights 5. The uprights 5 at the upper corners thereof, when the device is in its set up position, have pivotally secured thereto, as at 6, longitudinally extending members 7, the opposite ends of the said members being bent upon themselves, or otherwise provided with ears 8 which receive the upper ends of the rear uprights 5 of the sides 2. An angular brace 9 is pivotally connected adjacent the upper edges of the rear uprights 5 and the lower edges of the front uprights 5, and these brace members serve as contacts or abutment members for the ears 8 to limit the movement of the same upon the rear uprights 5. The rear uprights have attached thereto flexible elements preferably in the nature of chains, each of the said chains having its end link connected with an eye provided upon a pin 11, and the ends of the longitudinal members 7 opposite their ears 8, and also the ears 8 at the upper portions of the rear uprights 5 are provided with openings which register, when the device is set up, and through which are passed the pins 11. The central portion of the members 7 are extended inwardly for the major portion of the length of the said members, the inturned portions being arranged parallel with the ends of said members, and the said inturned portions are provided each with two openings, one arranged adjacent the front and the second adjacent the rear of the frame. The front openings are adapted to receive the short shafts or trunnions 12 provided upon a roller 13, while the rear alining openings are adapted to receive a bar 14 which serves as a pivot member for a substantially U-shaped yoke 15. The yoke has its connecting member provided with a longitudinally extending handle 16, and the arms of the yoke are provided with registering openings to receive the short shafts or trunnions 17 carried by a roller 18. One of the short shafts or trunnions 17 may be continued and bent at an angle to provide an operating handle 19, or the said handle 19 may comprise a separate member secured to the trunnion in any desired or preferred manner. The yoke is adapted to be swung over the top of the frame, so that its roller 18 will rest upon the roller 13, and when the handle 19 is manipulated, the rollers will be rotated in opposite directions, causing a mop or the like, which is arranged between the rollers, to be wrung to express the water therefrom.

The front of the device comprises two transverse or connecting members 20 and 21, the said members preferably having their ends offset and rigidly secured to the inner faces of the front uprights 5. The connecting bar 21, which is arranged adjacent the lower end of the frame, is adapted to receive, upon its opposite faces, the hooked end portions 22 of a bucket support 23. The members comprising the support have their rear ends connected by a transverse bar 24, and this bar preferably has its ends arranged at a downward angle between the rear uprights 5 of the side members of the frame, and the said angular portions are pivotally connected to the said rear uprights, as at 25.

In collapsing the device the pins 11 are removed to permit of the members 7 being swung over the front of the frame, the yoke 15 being swung outwardly or in an extended position with relation to the members 7. The bucket frame or support 21 is swung upwardly between the rear uprights 5, and the brace members 9, together with the rear uprights of the bucket support 23 are swung against the rear or the front of the device, thus folding the frame to produce a comparatively small bundle which will occupy a small space for storage, and which also may be readily and conveniently transported.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device of the class described, a frame comprising side members having an angular pivoted brace, a front comprising bars connecting the side members, a top comprising longitudinal members pivotally secured to the side members of the front thereof and having their opposite ends formed with ears to engage with the rear members of the sides, means for removably securing the ears upon the sides, a roller connected with the upper longitudinal members, a yoke pivoted between the said members, a second roller carried by the yoke and adapted to be swung into engagement with the first mentioned roller, a handle for the second roller, a pivoted bucket support upon the rear members of the side frames, said support having a hooked free end, and said hooked end adapted to be swung into engagement with one of the connecting members of the sides forming the front of the frame.

2. In a collapsible and foldable device of the class described, a frame including sides comprising spaced uprights, a pivoted angular brace connecting the uprights, longitudinal members pivotally secured to the front uprights, said members having their free ends looped to provide ears adapted to be arranged over the upper ends of the rear uprights of the sides into contact with the angular brace members therefor, removable members for sustaining the ears upon the uprights, a roller trunnioned between the said longitudinal members, a rod connecting the longitudinal members, a U-shaped yoke rotatably mounted upon the rods, said yoke having its connecting member provided with an extending handle, a roller trunnioned between the ears of the yoke and adapted to engage with the first mentioned roller, a handle for the second mentioned roller, a front for the frame comprising transverse members connecting the outer uprights of the side, a bucket support, said bucket support including a rear transverse member which is pivotally connected with the rear uprights of the sides at the lower portions thereof, the opposite end of the bucket support being formed with downturned portions forming ears, and the said ears adapted to engage with the opposite faces of the lower front connecting member.

In testimony whereof, I affix my signature in presence of two witnesses.

WILLIAM F. KURTZ.

Witnesses:
S. B. HARRIS,
R. O. ANTELMAN.